(12) United States Patent
Jacobson

(10) Patent No.: US 8,976,057 B1
(45) Date of Patent: Mar. 10, 2015

(54) TCAS PRIMARY ANTENNA ON AIRCRAFT UNDERSIDE SYSTEM AND METHOD

(75) Inventor: Randy H. Jacobson, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 274 days.

(21) Appl. No.: 13/540,419

(22) Filed: Jul. 2, 2012

(51) Int. Cl.
*G01S 13/93* (2006.01)
*G01S 3/14* (2006.01)
*G08G 5/04* (2006.01)

(52) U.S. Cl.
CPC ............... *G01S 13/9303* (2013.01); *G01S 3/14* (2013.01); *G08G 5/04* (2013.01)
USPC ............................................ 342/29; 701/301

(58) Field of Classification Search
USPC .......................................................... 342/29
See application file for complete search history.

(56) References Cited

U.S. PATENT DOCUMENTS

| | | | |
|---|---|---|---|
| 5,196,856 A * | 3/1993 | Litchford et al. | 342/455 |
| 5,463,398 A * | 10/1995 | Young | 342/46 |
| 5,469,172 A * | 11/1995 | Schleder et al. | 342/174 |
| 6,211,808 B1 * | 4/2001 | Rees | 342/29 |
| 6,222,480 B1 * | 4/2001 | Kuntman et al. | 342/30 |
| 6,313,783 B1 * | 11/2001 | Kuntman et al. | 342/32 |
| 6,727,842 B1 * | 4/2004 | Schleder et al. | 342/30 |
| 6,789,016 B2 * | 9/2004 | Bayh et al. | 701/301 |
| RE39,053 E * | 4/2006 | Rees | 342/29 |
| 7,436,350 B1 * | 10/2008 | Maloratsky et al. | 342/30 |

OTHER PUBLICATIONS

"Honeywell System Installation Manual" Manual No. 006-05370-0009. Revision 9. Feb. 2006. pp. 110-112, 2009-2011.*
TCAS 2000 Traffic Alert and Collision Avoidance System, System Description and Installation Manual, Honeywell, Aerospace Electronic Systems, Pub. No. A09-3841-001, Oct. 20, 1997, Revised Nov. 15, 2000, Printed in USA, 5 pages.

* cited by examiner

*Primary Examiner* — Matthew M Barker
(74) *Attorney, Agent, or Firm* — Angel N. Gerdzhikov; Donna P. Suchy; Daniel M. Barbieri

(57) ABSTRACT

A system and method for operational placement of Traffic Collision and Avoidance System (TCAS) antennas on an aerial vehicle. A TCAS primary directional antenna is configured to mount on a lower surface of the aerial vehicle wherein the directional antenna receives and determines a direction of reception of an RF signal. The omnidirectional antenna is mounted on an upper surface of the aerial vehicle for transmission and reception of TCAS signals. A TCAS processor has associated ports to send and receive signals to each antenna for communicating with TCAS target aircraft. The TCAS processor is configured to recognize a mounted location of the antennas via signals received from the inputs. The TCAS processor is further configured to accept a plurality of inputs via the associated ports from the lower mounted directional antenna yet still output accurate TCAS information to the TCAS display.

16 Claims, 10 Drawing Sheets

1002 — configuring and mounting a TCAS primary directional antenna on a lower surface of an aerial vehicle, the TCAS primary directional antenna configured for receiving and determining a direction of reception of an RF signal 1004 — mounting an omnidirectional antenna on an upper surface of the aerial vehicle 1006 — configuring the aerial vehicle with a TCAS processor, the TCAS processor having a first directional port, a second directional port, and a secondary port 1008 — connecting the TCAS primary directional antenna to at least one of the first directional port and the second directional port via a plurality of directional connectors 1010 — connecting the omnidirectional antenna at least one of the first directional port and the second directional port 1012 — configuring the TCAS processor to recognize a mounting location of the TCAS primary directional antenna and a mounting location of the omnidirectional antenna, as mounted on the aerial vehicle 1014 — sending and receiving signals to the omnidirectional antenna 1016 — receiving the direction of reception from the TCAS primary directional antenna 1018 — displaying TCAS information on a TCAS display, the TCAS display configured for displaying TCAS information to a pilot of the aerial vehicle

TCAS PRIMARY ANTENNA ON AIRCRAFT UNDERSIDE SYSTEM AND METHOD

FIELD OF THE INVENTION

The present invention relates generally to installation and use of antennas on board an aircraft. More particularly, embodiments of the present invention relate to a system for mounting a primary Traffic Alert and Collision Avoidance System (TCAS) antenna on the lower side of an aircraft allowing for unrestricted transmission and reception of TCAS signals on aircraft with undesirable RF blockers on the aircraft topside.

BACKGROUND OF THE INVENTION

Traffic Alert and Collision Avoidance Systems (TCAS) have been operational in aircraft for a number of years. TCAS may determine, on a first aircraft, whether an approaching aircraft will come within a minimum distance of a position of the first aircraft. TCAS equipment on the first aircraft may interrogate a transponder on an in-range second aircraft and listen for the transponder reply. By computer processor analysis of these replies, the airborne TCAS processor may display all TCAS targets within a certain range and may determine if one of the TCAS targets may represent a potential collision threat. If so, TCAS may provide indications (both visual and aural) to a pilot to offer separation guidance. TCAS may use radio frequency (RF) transmissions between the two aircraft to determine range and bearing. The altitude of the other aircraft is obtained through the interrogation response. Using subsequent interrogations, TCAS determines the closure rate and the altitude rate of the other aircraft.

The RF signals are transmitted via two antennas: one antenna mounted on an external upper surface of the aircraft and one mounted on an underside of an aircraft. Traditionally, the antennas used by TCAS include a directional antenna mounted on the top of the aircraft and an omnidirectional antenna mounted on the bottom of the aircraft. Two antennas may be required for TCAS certification from various traffic control entities in whose airspace the aircraft may fly.

The directional antenna may comprise a four-beam antenna capable of individual power outputs in each directional beam. Traditionally, each beam may transmit in a 90 degree horizontal azimuth pattern with a vertical elevation of approximately plus and minus 20 degrees. Each beam may transmit at an individual power level, with the forward beam the strongest, to ensure necessary coverage. The RF signals received by the directional antenna may allow the TCAS processor to determine the relative bearing to the other aircraft.

An omnidirectional antenna may also transmit and receive RF energy providing input to the TCAS processor. Traditionally, the omnidirectional antenna has been mounted on the underside of the aircraft. An omnidirectional antenna may provide the same level of safety for collision avoidance, but does not provide bearing information. Hence, any interrogation responses only received by the omnidirectional antenna will not provide bearing information. This configuration may have proven beneficial in the past, where the top of the aircraft does not have as many obstructions, such as landing gear. Thus, the directional antenna mounted on the aircraft top may receive the more critical signal.

RF energy may be inhibited by a metal physical structure. One of the reasons for a traditional dual antenna configuration may stem from the fact that the aircraft structure may block RF energy. RF signals transmitted from an antenna mounted on the bottom of an aircraft may be partially or completely blocked by the aircraft structure keeping the signals from reaching an aircraft at a higher altitude than the transmitting aircraft. Similarly, signals transmitted from a higher aircraft may not reach an antenna mounted to the bottom of a lower altitude aircraft. For this reason, both top and bottom antennas are required for TCAS processing. The TCAS processor uses both antennas to maintain a complete picture of the traffic around the aircraft to which it is mounted.

On a typical fixed wing aircraft, there are more physical obstructions on the bottom of the aircraft than there are on the top. The landing gear of a fixed wing aircraft is typically the greatest obstruction to a clear view around the aircraft. As such, the directional antenna has historically been mounted on the top of an aircraft as in that location, there are fewer obstructions.

On certain aerial vehicles, there are numerous operationally required but RF blocking fixtures mounted on the top of the aircraft. For example, the rotor on a helicopter may be constructed of material not suitable for transmission of RF energy. Although signals received from an aft direction may be not as critical, a helicopter tail rotor may extend vertically to inhibit RF energy in the aft direction. On other aircraft types for example, vertically extending structures such as a vertical tail or a high mounted elevator on the tail may extend vertically such to inhibit TCAS reception from the aft direction. Also, other antenna elements and associated support structure may extend vertically above an aerial vehicle structure such to inhibit transmitted RF energy from a top mounted antenna.

Directional antenna performance may be further inhibited if the directional antenna may be mounted on a non-level surface. The elevation of transmission and reception of the directional antenna may be dependent upon the physical angle at which the antenna is mounted. A fixed antenna may transmit and receive at a fixed elevation. Therefore, if an antenna is mounted at an angle other than that angle at which the aircraft is traveling, the azimuth of transmission and reception of the antenna will be altered by the number of degrees of difference between the angle and the direction of aircraft travel. This alteration may adversely affect TCAS performance.

There may be few level surfaces on the upper fuselage of a particular aerial vehicle on which to mount a directional antenna. Top mounted engine cowlings, fuselage structure, and gearbox covers may require ease of maintenance access such that an antenna mounted to the covers may be impractical.

Directional antenna performance may also be degraded without a sufficient ground plane in proximity to the mounted antenna. A sufficient ground plane for accurate reception may typically be a 2 ft. radius circle around the mounted location of the antenna. The structure and aerodynamic design of some aerial vehicles may require no flat ground plane surface on the top of the aerial vehicle.

Therefore, a novel approach may be necessary to allow for unrestricted reception of a TCAS signal on an aircraft with uneven or undesirable RF blocking surface structure on the aircraft top. This novel approach may comprise locating the TCAS primary directional antenna on a position other than the top of an aircraft.

SUMMARY OF THE INVENTION

Accordingly, a preferred embodiment of the present invention is directed to a system for operational placement of Traffic Collision and Avoidance System (TCAS) antennas on an aerial vehicle, the system comprising: a TCAS primary directional antenna configured to mount on a lower surface of the aerial vehicle, the TCAS primary directional antenna configured for receiving and determining a direction of reception of an RF signal, an omnidirectional antenna configured to mount on an upper surface of the aerial vehicle. A TCAS display is configured to be viewable by a pilot of the aerial vehicle, a TCAS processor is configured to operatively connect to: the directional antenna, the omnidirectional antenna, and the TCAS display, wherein the TCAS processor is configured for: sending and receiving signals to the omnidirectional antenna, recognizing a mounting location of the TCAS primary directional antenna and a mounting location of the omnidirectional antenna, as mounted on said aerial vehicle, the omnidirectional antenna mounted to an upper surface of the aerial vehicle, receiving the direction of reception from the TCAS primary directional antenna, the TCAS primary directional antenna mounted on the lower surface of the aerial vehicle, and displaying TCAS information on the TCAS display.

A further embodiment of the present invention is directed to a method for operational placement of Traffic Collision and Avoidance System (TCAS) antennas on an aerial vehicle. The method comprises configuring and mounting a TCAS primary directional antenna on a lower surface of the aerial vehicle, the TCAS primary directional antenna configured for receiving and determining a direction of reception of an RF signal. The method also comprises mounting an omnidirectional antenna on an upper surface of the aerial vehicle, configuring the aerial vehicle with a TCAS processor, the TCAS processor having a first directional port, a second directional port, and a secondary port. The method further comprises connecting the TCAS primary directional antenna to at least one of the first directional port and the second directional port via a plurality of directional connectors, connecting the omnidirectional antenna at least one of the first directional port and the second directional port. The method further comprises configuring the TCAS processor to recognize a mounting location of the TCAS primary directional antenna and a mounting location of the omnidirectional antenna, as mounted on the aerial vehicle, sending and receiving signals to the omnidirectional antenna, receiving the direction of reception from the TCAS primary directional antenna, and displaying TCAS information on a TCAS display. The TCAS display is configured for displaying TCAS information to a pilot of the aerial vehicle.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 10 is a flowchart depicting a preferred embodiment of the present invention.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Figure 1:
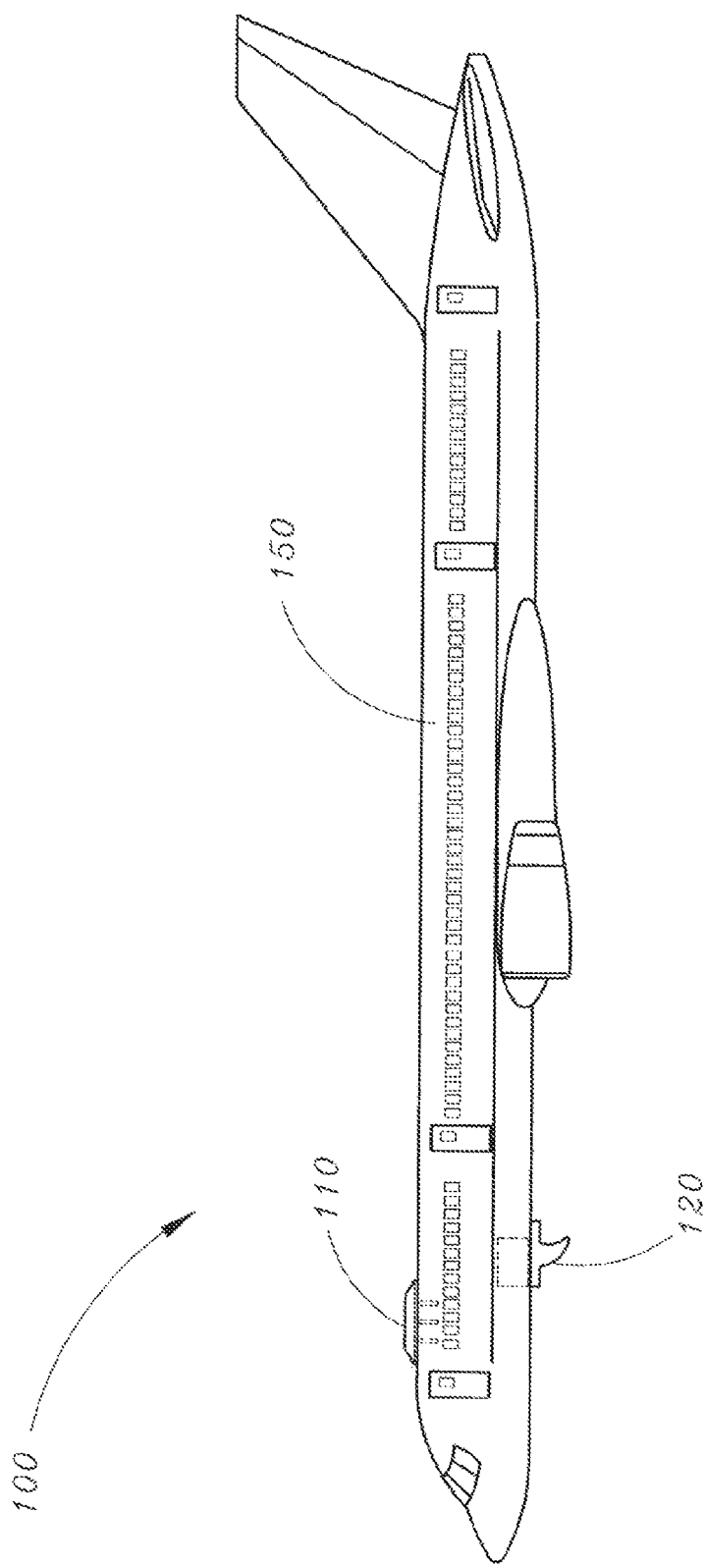
FIG. 1 is a diagram of a currently used configuration of TCAS antenna placement on an aircraft as background to the disclosure of the present invention.

Referring to FIG. 1, a diagram of a currently used configuration of TCAS antenna placement on an aircraft as background to the disclosure of the present invention is shown. Aircraft 150 may be of a fixed wing heavier than air type. Mounted to the top of the aircraft may be TCAS primary directional antenna 110. Mounted to the underside of the aircraft may be omnidirectional antenna 120. A traditional upper surface mounted directional antenna may maintain conformity with worldwide standards. As used herein, an upper surface of an aerial vehicle may be defined as the surface of the aerial vehicle more distal from the surface of the earth during a majority of the flight of the aerial vehicle. TCAS primary directional antenna 110 may be traditionally mounted to a mostly flat surface on the upper surface of the aircraft fuselage.

Omnidirectional antenna 120 may traditionally mount to a flat surface on a lower surface of the aircraft and send and receive signals from any unobstructed direction. As used herein, a lower surface of an aerial vehicle may be defined as the surface of the aerial vehicle more proximal to the surface of the earth during a majority of the flight of the aerial vehicle.

Figure 2A:
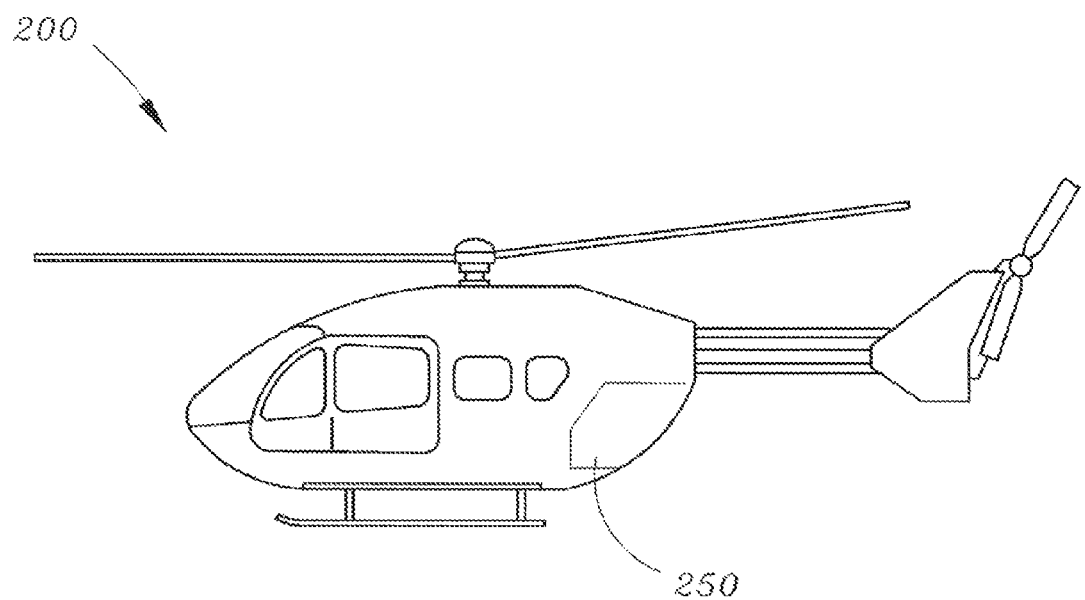
FIG. 2a is a diagram of an example of an aerial vehicle to which an embodiment of the present invention may be configured to mount.

Referring to FIG. 2a, a diagram of an example of an aerial vehicle to which an embodiment of the present invention may be configured to mount is shown. Aerial vehicle 250 may, for example, be a helicopter. Of note on the upper surface of aerial vehicle 250 there are few level surfaces to which a TCAS primary directional antenna may be mounted. Also notable are the main rotor and tail rotor both extending vertically above the top surface of the aerial vehicle 250. As used herein, an aerial vehicle may be defined as a heavier than air vehicle, a lighter than air vehicle, a fixed wing vehicle, a rotary wing vehicle, a spacecraft, a powered aircraft, and an unpowered aircraft.

Figure 2B:
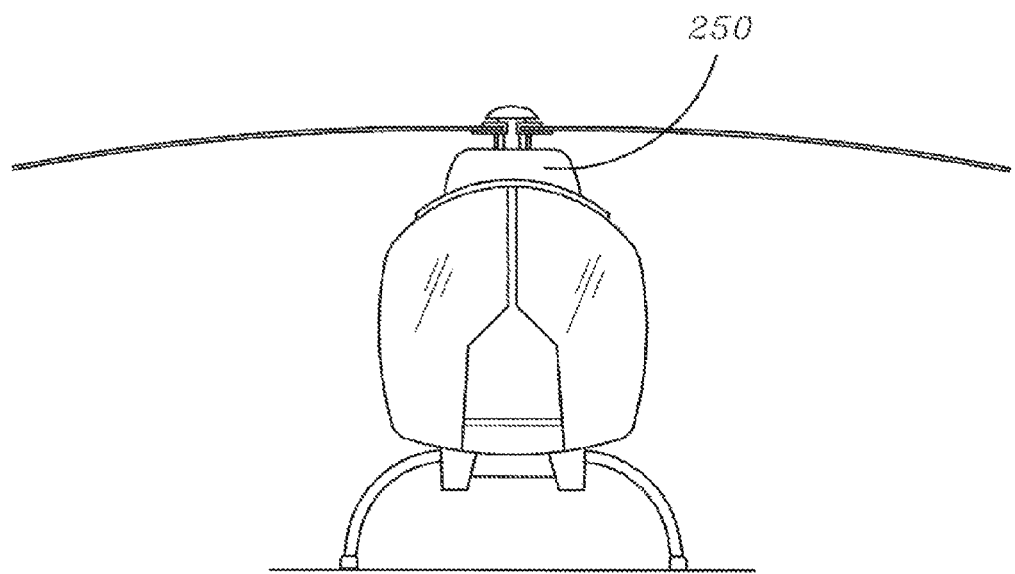
FIG. 2b is also a diagram of an example of an aerial vehicle to which an embodiment of the present invention may be configured to mount.

Referring to FIG. 2b, a diagram of an example of an aerial vehicle to which an embodiment of the present invention may be configured to mount is shown. From a front view of the aerial vehicle 250, it may be noted the upper surface maintains few level surfaces to which a TCAS primary directional antenna may be mounted.

Figure 3:
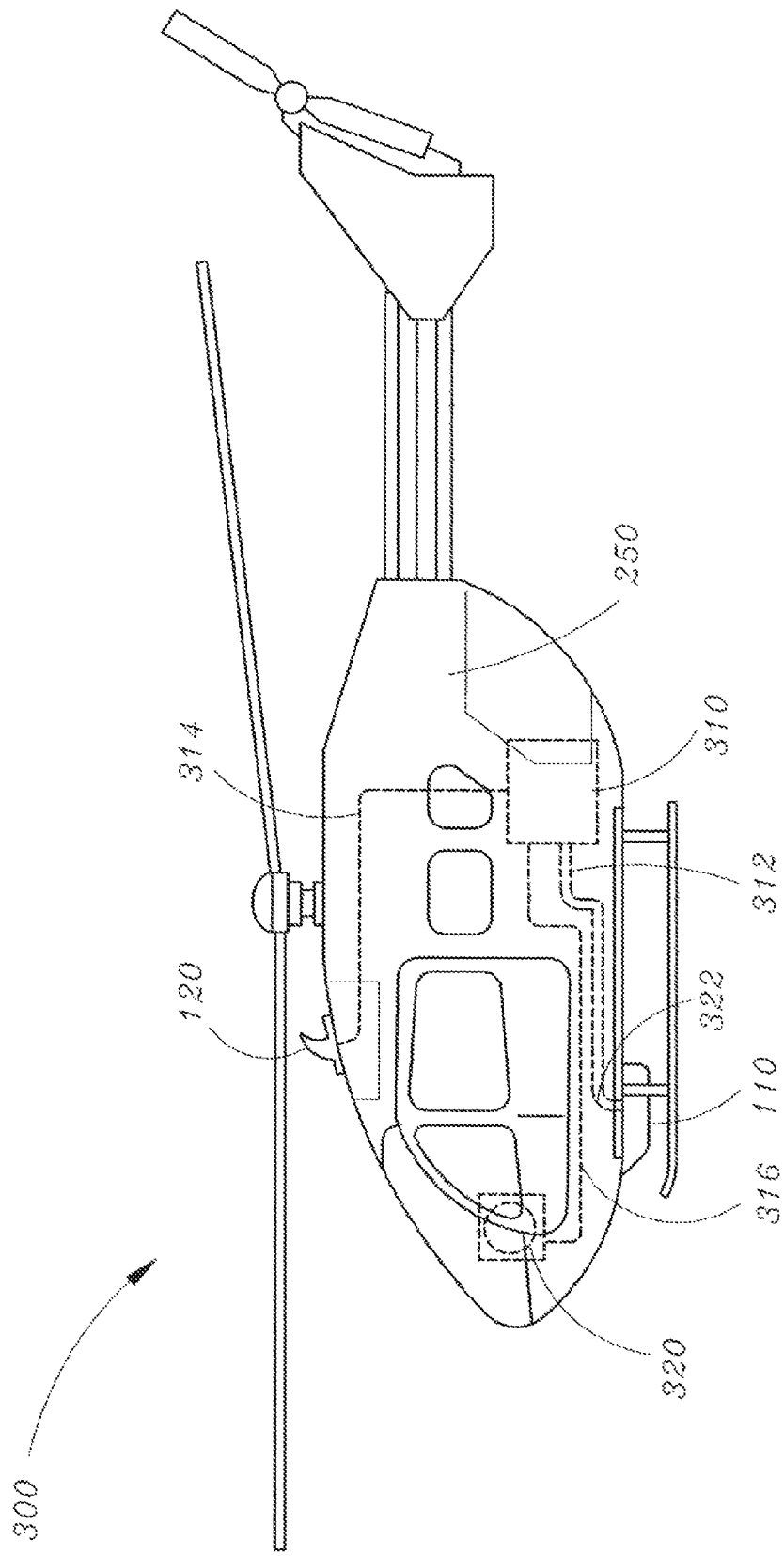
FIG. 3 is a diagram of one embodiment of the present invention configured to mount on a helicopter.

Referring to FIG. 3, a diagram of one embodiment of the present invention configured to mount on a helicopter is shown. Aerial vehicle 250 may be a helicopter to which an embodiment of the present invention may be configured to operatively mount. TCAS primary directional antenna 110 may be configured to mount to the lower surface of the aerial vehicle 250. TCAS primary directional antenna 110 may transmit and receive an RF signal and be configured to determine a direction of reception of the RF signal. TCAS primary directional antenna may operatively connect to the TCAS processor 310 via a plurality of connectors mounted on the TCAS primary directional antenna. The connectors may connect the directional antenna 110 to the TCAS Processor 310 via associated wiring 312 and 322.

Omnidirectional antenna 120 may be configured to mount to an upper surface of the aerial vehicle 250. Omnidirectional antenna 120 may transmit and receive RF signals without discrimination of direction of reception. Omnidirectional antenna 120 may operatively connect to the TCAS processor 310 via associated wiring 314. Of note, omnidirectional antenna 120 may be of considerable smaller size than that of the TCAS primary directional antenna. Thus the upper placement of the omnidirectional may not impede maintenance operations near the aerial vehicle topside. Additionally, it is not necessary that the upper antenna is mounted on a flat surface, nor is it necessary that it is mounted on a surface that is parallel to the ground.

The TCAS Processor 310 may operatively connect to a TCAS display 320 via associated wiring 316. TCAS display 320 may be configured to display TCAS information to a pilot of the aerial vehicle. Additionally, the TCAS processor 310 may transmit TCAS information to additional locations onboard or off-board the aerial vehicle 250. For example, the TCAS processor may transmit TCAS information to an autopilot on board the aerial vehicle for an automated flight maneuver in response to a TCAS threat or to a flight data recorder. Additionally, the TCAS processor 310 may transmit TCAS information to a data link computer for further transmission off-board the aerial vehicle.

Figure 4:
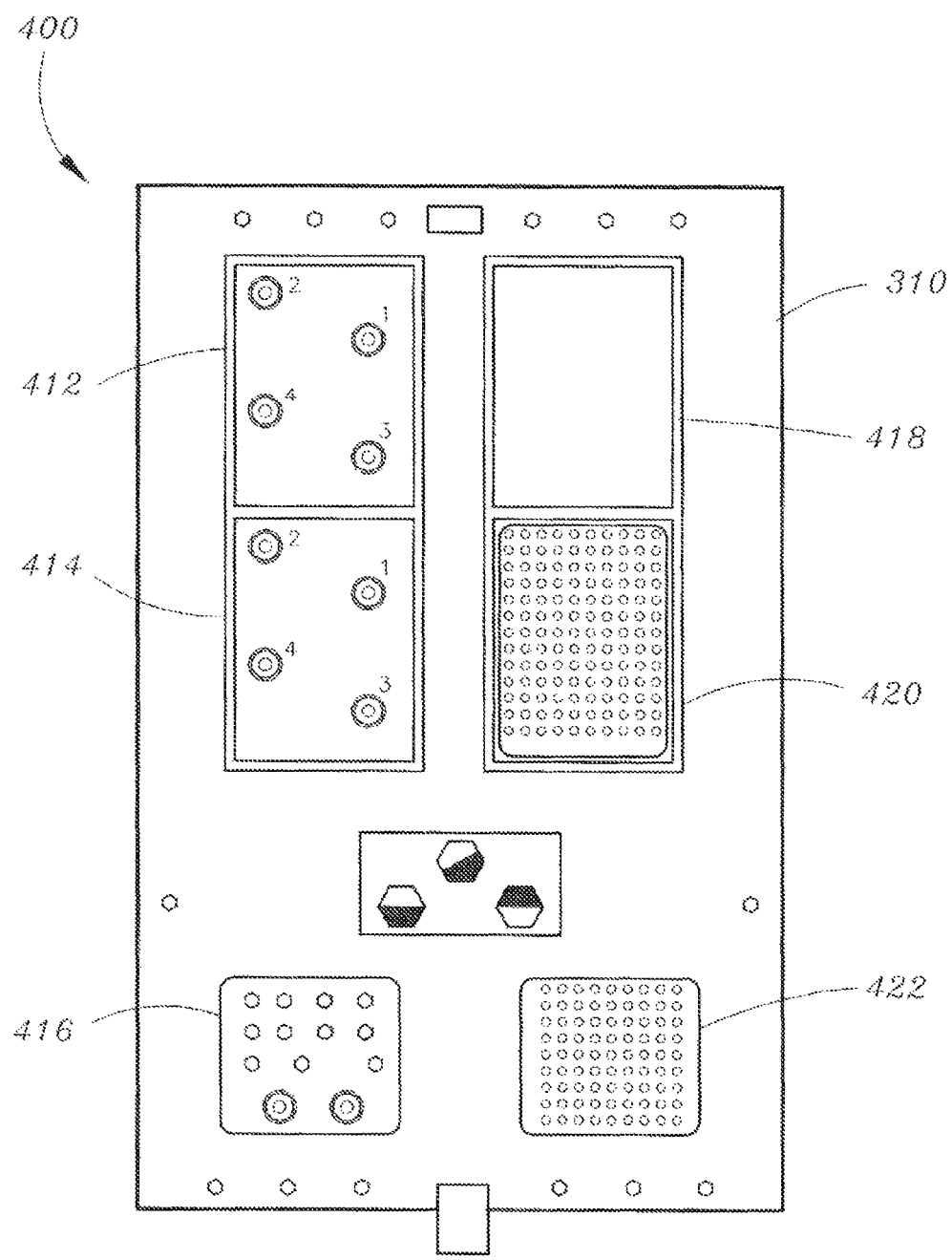
FIG. 4 is a diagram of a TCAS processor configurable to operate with an embodiment of the present invention.

Referring to FIG. 4, a diagram of a TCAS processor configurable to operate with an embodiment of the present invention is shown. A first directional port 412 may also be referred in practice as a left top plug (or LTP). The first directional port 412 may receive input from the four quadrants of a TCAS primary directional antenna 110. Traditionally, pins 1-4 of first directional port may be configured to send and receive signals to and from connectors on a TCAS primary directional antenna 110. Pins 1-4 of first directional port 414 may provide individual input from the directional antenna to the TCAS processor 310. It is contemplated first directional port 412 may be configured to receive input from a plurality of antennas mounted on the surface of an aerial vehicle. In embodiments of the present invention, first directional port 412 may send and receive signals to/from a TCAS primary directional antenna 110 mounted to a lower surface of an aerial vehicle. In additional embodiments, first directional port 412 may be configured to send and receive signals to/from an omnidirectional antenna 120 mounted to an upper surface of the aerial vehicle.

Second directional port 414 may be known in practice as a left middle plug (or LMP). Second directional port 414 may have traditionally been configured to receive input from either an omnidirectional antenna or a secondary TCAS directional antenna mounted to a lower surface of an aerial vehicle. In embodiments of the present invention, pins 1-4 of second directional port 414 may be configured to send and receive signal to and from a omnidirectional antenna 120 mounted to an upper surface of an aerial vehicle. In additional embodiments of the present invention, second directional port 414 may send and receive signals to/from a TCAS primary directional antenna 110 mounted to a lower surface of an aerial vehicle.

Secondary port 416 may be known in practice as a left bottom plug (or LBP). Secondary port 416 may be configured to receive input from a plurality of sources including a plurality of antennas. In embodiments of the present invention, secondary port 416 may receive an optional input from a common ground enabling the TCAS processor to determine upon which surface of the aerial vehicle the TCAS primary directional antenna is mounted. It is contemplated the TCAS processor may receive this input and vary an output of TCAS information accordingly. For example, should the TCAS primary directional antenna be mounted to an upper surface of the aerial vehicle, a specified pin of secondary port 416 may be open. Output of TCAS targets received by the divisions of the TCAS primary directional antenna may be properly interpreted by sources receiving the output (TCAS display, autopilot, etc.). Conversely, should the TCAS primary directional antenna be mounted on a lower surface of the aerial vehicle, the specified pin of the secondary port may receive that input and, based on the input, output TCAS targets accordingly. Alternatively, the specified pin may be on any of the other input ports of the TCAS (420 or 422); secondary port 416 is exemplarily used herein.

Alternatively, antenna placement determination may be accomplished by other methods, including a field loadable SW file, an 10 input from the aircraft (e.g. an ARINC 429 word), a different resistance value read on the antenna feedback, etc. For illustration purposes, all strapping methods are referred to as being done on the secondary port, but the implementation is not limited to the use of the secondary port.

It is further contemplated, a TCAS primary directional antenna may be comprised of a plurality of antenna elements mounted to a plurality of surfaces of an aerial vehicle. It is within the scope of the present invention to include a plurality of antennas comprising associated antenna elements providing input to the first directional port, the second directional port, and secondary port. The TCAS processor may be configured to receive such input and to output TCAS information to display TCAS targets to a pilot of the aerial vehicle and output the TCAS information to above mentioned additional destinations.

Figure 5:
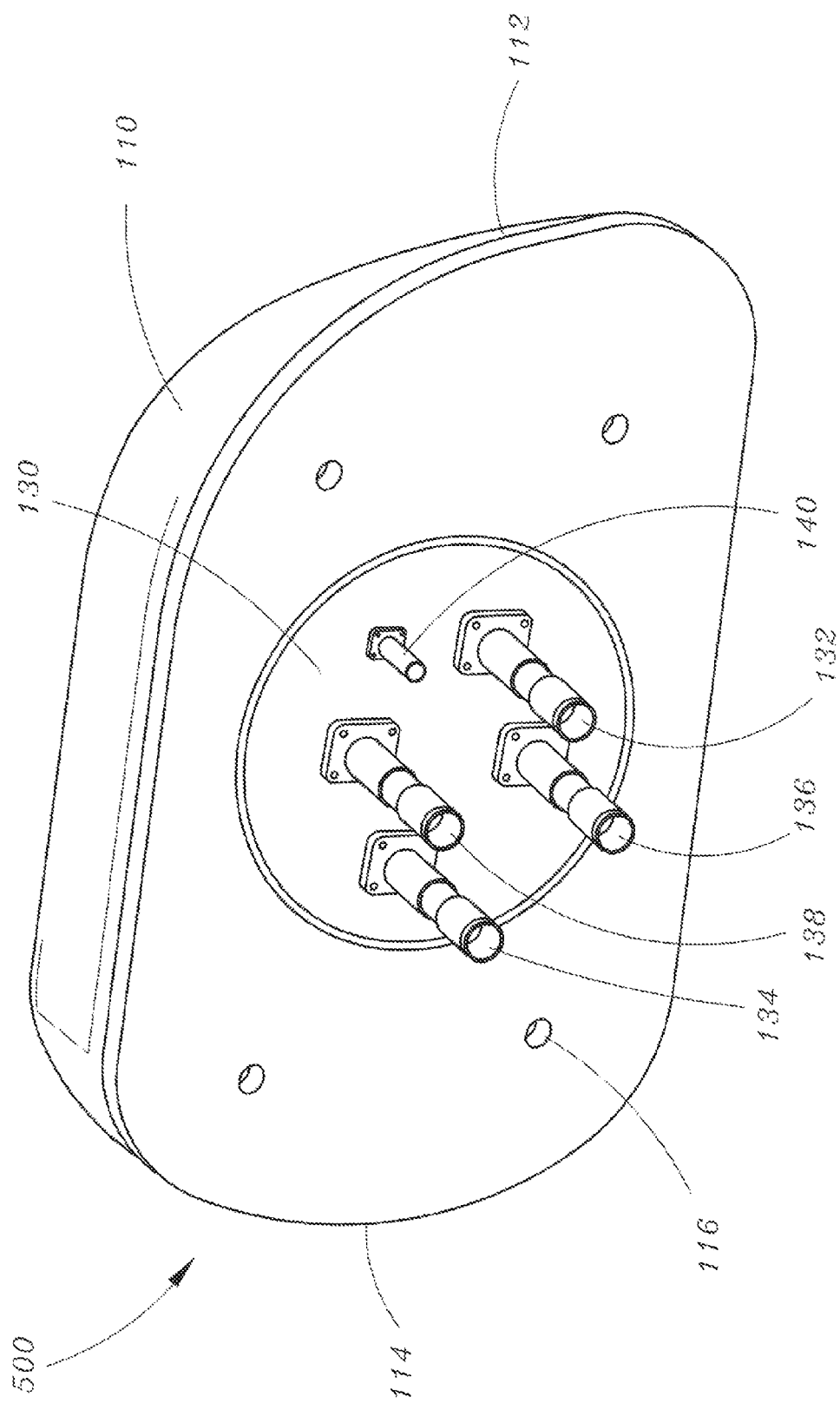
FIG. 5 is a diagram of a TCAS primary directional antenna configured to operate with a preferred embodiment of the present invention.

Referring to FIG. 5, a diagram of a TCAS primary directional antenna configured to operate with a preferred embodiment of the present invention is shown. TCAS primary directional antenna 110 may have a forward end 112 and an aft end 114. The Forward end 112 may be aerodynamically shaped to minimize drag associated with flow of air around the aerial vehicle 250 to which the antenna is mounted. Mounting points 116 may provide structural support to mount the antenna to the skin of the aerial vehicle. Connection panel 130 may provide structure allowing for connectors to communicate with additional elements of the system. A plurality of directional connectors 132-138 may enable azimuth divisions of the TCAS primary directional antenna to send individual signals to the TCAS processor. Alternatively, secondary connector 140 may provide a TCAS primary directional antenna location signal to the TCAS processor indicating a location of mounting of the TCAS primary directional antenna 110.

The plurality of directional connectors may provide azimuth discrimination to a received RF signal. For example, in the present view of the antenna, while the TCAS primary directional antenna is mounted to an upper surface of the aerial vehicle, directional connector 138 may receive an RF signal from the right side of the aerial vehicle, Directional connector 136 may receive an RF signal from the left side of the aerial vehicle, directional connector 132 may receive an RF signal from the forward division, and directional connector 134 may receive an RF signal from an aft direction of the aerial vehicle.

In a preferred embodiment of the present invention, the TCAS primary directional antenna may be mounted on a lower surface of the aerial vehicle. In this configuration, directional connectors 132 and 134 may retain the forward/aft coverage as indicated above while areas of coverage of directional connectors 136 and 138 will reverse. For example, a TCAS primary directional antenna mounted to the lower surface of a helicopter may require directional connector 136 to receive an RF signal from the right side of the helicopter while directional connector 138 will receive RF energy from the left side. In this preferred embodiment, the TCAS processor is able to discriminate the mounted location of the directional antenna and display TCAS targets accordingly.

Further, TCAS primary directional antenna 110 may be divided into a plurality of azimuth divisions to enable the TCAS primary directional antenna to distinguish a direction of reception of the RF signal. Traditionally, such divisions may have been four equal quadrants of 90 degrees azimuth. However, it is contemplated the present invention may be configured to operate using additional types of antennas comprising a variety of directional nomenclature. In the indicated example of FIG. 5, the plurality of directional connectors is shown as 4. It is contemplated a number of directional connectors greater than 4 may be an alternative in the present invention. A number of divisions of 10 or 20 may provide greater accuracy and greater sensitivity then the indicated example of 4.

The plurality of azimuth divisions may be aligned with the relative axis of the aircraft. For example, a forward quadrant may be centered at zero degrees relative bearing (centered on the nose) while the aft quadrant may be 45 degrees either side of the 180 degree relative bearing of the aircraft (centered on the tail). A left quadrant may center on the "left wing" at 270 relative bearing, and a right quadrant may center on the "right wing" at 090 degrees relative bearing. These quadrants may allow the directional antenna 110 to distinguish a bearing of an incoming RF signal.

In an alternate embodiment, secondary connector 140 may transmit a TCAS primary directional antenna location signal. Such TCAS primary directional antenna location signal may indicate to additional elements of the preferred system where the TCAS primary directional antenna is physically placed on the aerial vehicle. For example, should the TCAS primary directional antenna be mounted on the lower surface of an aerial vehicle, the signal sent through secondary connector 140 may allow the TCAS processor to include, in TCAS calculations, a plurality of physical attributes of the aerial vehicle. For example, a TCAS primary directional antenna mounted on a lower surface of a helicopter may require additional variables be included in TCAS calculations to consider helicopter skids and additional equipment mounted on the lower surface of the helicopter.

Figure 6:
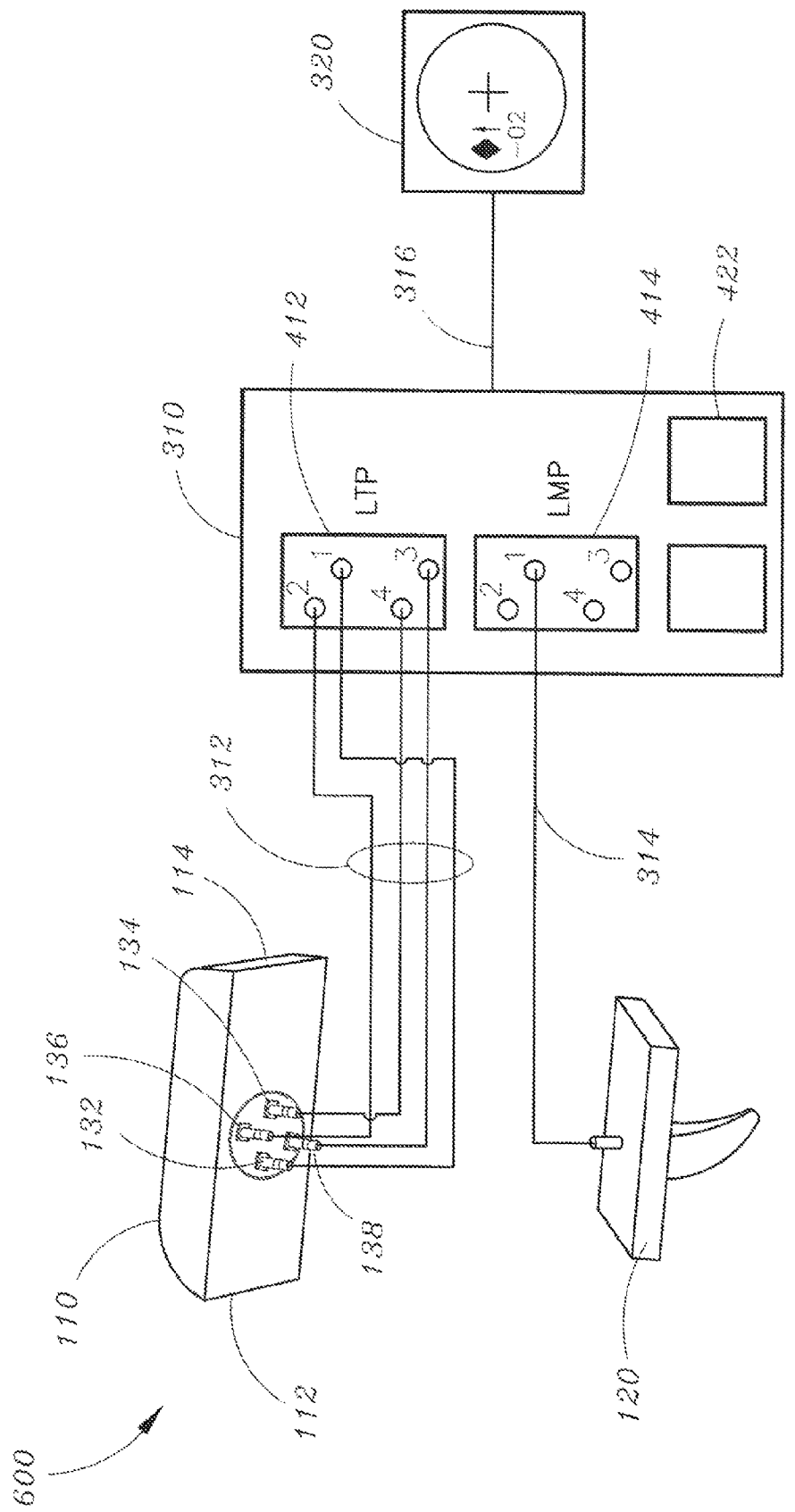
FIG. 6 is a diagram depicting a traditional configuration of TCAS antennas and associated connections.

Referring to FIG. 6, a diagram depicting a traditional configuration of TCAS antennas and associated connections is shown. Upper mounted TCAS primary directional antenna 110 may traditionally connect to first directional port 412 through the plurality of directional connectors 132-138 and associated wiring 312. Lower mounted omnidirectional antenna 120 may connect to second directional port 414 via associated wiring 314. The TCAS processor 310 may send and receive signals to and from associated antennas. The TCAS processor 310 may further process received signals and provide an output configured to display on a TCAS display 320.

Figure 7:
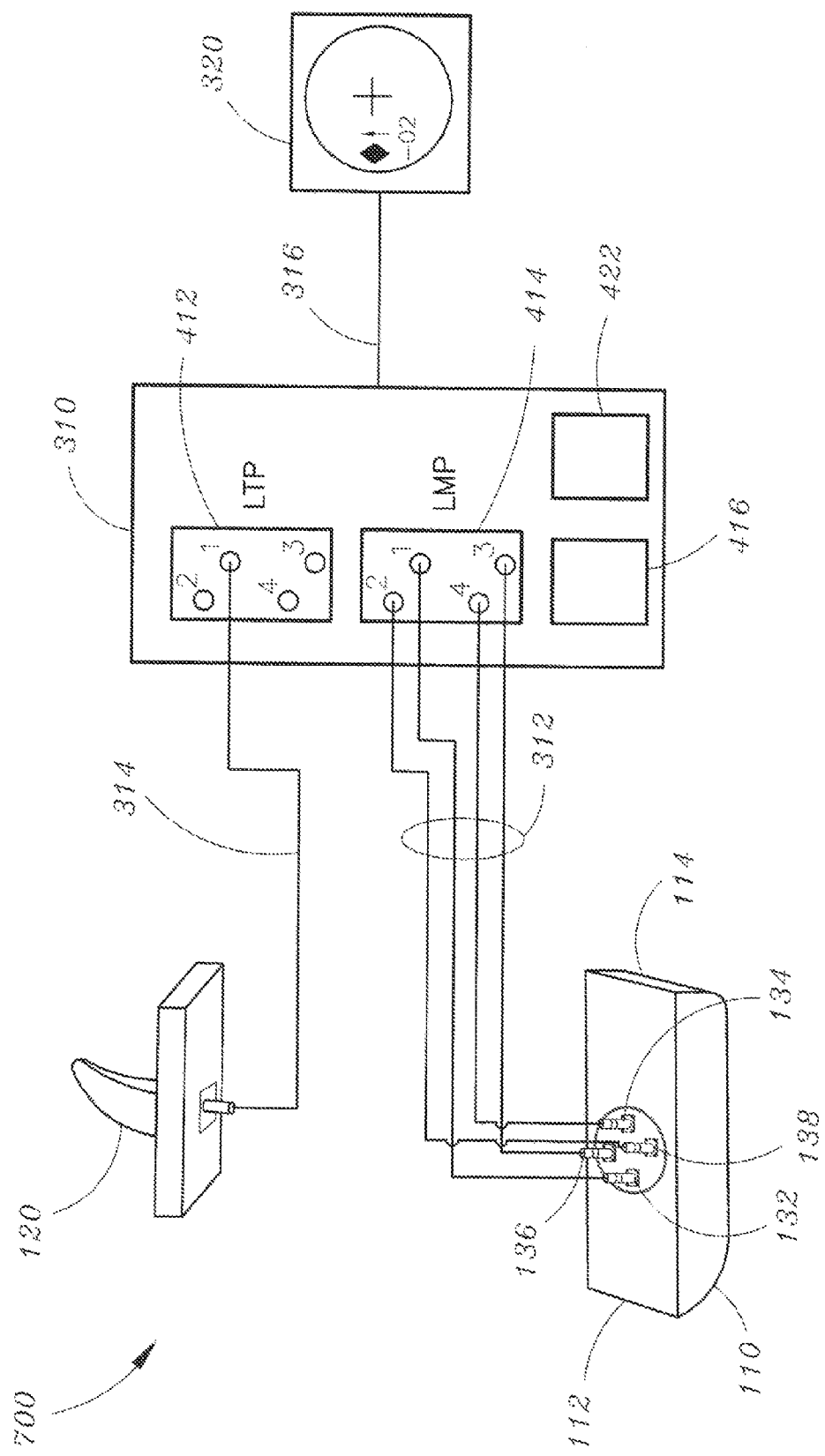
FIG. 7 is a diagram depicting a preferred embodiment of the present invention.

Referring to FIG. 7, a diagram depicting a preferred embodiment of the present invention is shown. Lower mounted TCAS primary directional antenna may be mounted with forward end 112 aligned with the forward end of the aerial vehicle 250 and aft end 114 aligned with an aft end of the aerial vehicle 250. Each of plurality of directional connectors 132-138 may connect to a second directional port 414 on the TCAS processor 310 via associated wiring 312. Upper mounted omnidirectional antenna 120 may connect to pin 1 of first directional port 412. Upper mounted omnidirectional antenna 120 may connect to secondary directional port 414 on the TCAS processor 310 via associated wiring 314.

Traditionally, each of the plurality of directional connectors 132-138 may maintain an individual resistance. When connected to and measured by the TCAS processor 310, the directional connector may return the proper resistance indicating proper associated wiring placement between the TCAS primary directional antenna 110 and the TCAS processor 310. Should a technician incorrectly connect the plurality of directional connectors to the TCAS processor, the TCAS processor 310 may indicate an "antenna failure" to the TCAS display 320.

In the present embodiment, the TCAS processor 310 may provide a resistance determination indicating the TCAS primary directional antenna is mounted on a lower surface of the aerial vehicle. Such determination may allow the signals sent by TCAS primary directional antenna 110 to be properly output by the TCAS processor 310 and properly recognized and displayed by the TCAS display 320. For example, should left directional connector 138 be connected to pin 2 of first directional port, the TCAS processor may recognize (using the individual resistance level of the connector) which of the connectors is connected to the appropriate pin and thus output proper TCAS information to the display 320.

Embodiments of the present invention may provide a plurality of combinations of directional connectors 132-138 of a TCAS primary directional antenna to connect to the plurality of pins of the first 412 and second 414 directional ports associated with the TCAS processor 310. Software configured within TCAS processor may be configured to receive signals, process, and properly transmit TCAS information. Further, software within the TCAS processor may recognize the specific connections of the specific elements connected to the first and second directional ports and continue to properly output accurate TCAS information.

Preferred embodiments of the present invention may provide a TCAS primary directional antenna to be mounted on one of a plurality of surfaces of an aerial vehicle. For example, as the TCAS primary directional antenna may be mounted on a lower surface of an aerial vehicle, a left division of TCAS primary directional antenna 110 may receive an RF signal from a TCAS target to the left of the aerial vehicle. Left directional connector 138 may transmit the signal through associated wiring 312 to pin 2 of secondary directional port 414. The TCAS processor 310 may receive and process the signal transmitting TCAS information to TCAS display 320 via associated wiring 316. TCAS display 320 may display the TCAS information on the left of the display indicating a TCAS target to the left of the aerial vehicle.

Figure 8:
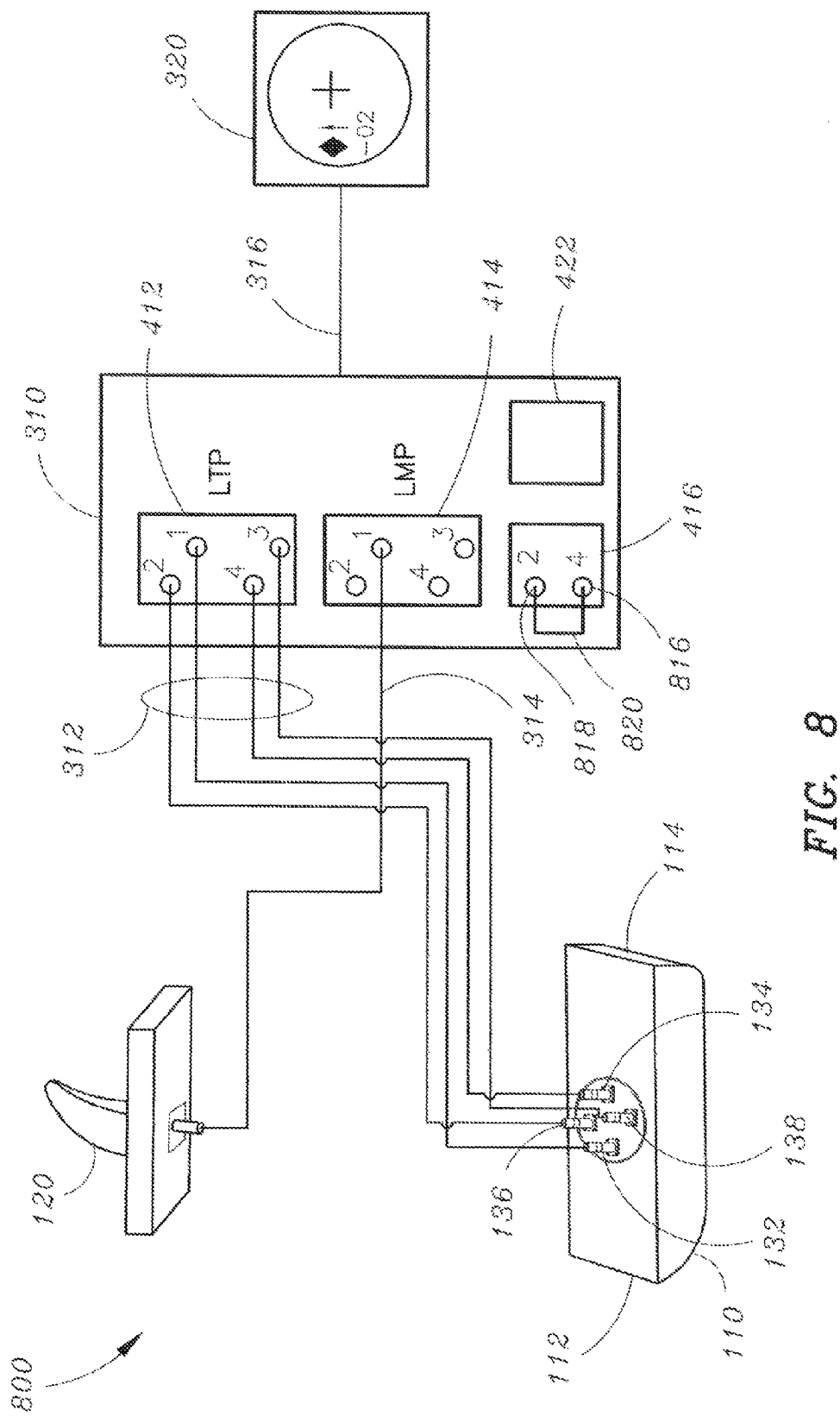
FIG. 8 is a diagram depicting one embodiment of the present invention.

Referring to FIG. 8, a diagram depicting one embodiment of the present invention is shown. Directional connectors 132-138 may connect to first directional port 412 of the TCAS processor 310. Specifically, directional connectors are configured according to the following table:

| Element | TCAS processor port |
| --- | --- |
| FWD 132 | LTP 1 |
| AFT 134 | LTP 4 |
| LEFT 138 | LTP 3 |
| RIGHT 136 | LTP 2 |
| Strapping Input | LBP 2 |
| Common Ground | LBP 4 |
| Omnidirectional | LMP 1 |

In the present exemplary embodiment of FIG. 8, directional connectors 132-138 may connect to first directional port via associated wiring 312. Specifically, forward division directional connector 132 may connect to first directional port 412 pin 1. Aft directional connector 134 may connect to first directional port 412 pin 4. Left directional connector 138 may connect to first directional port 412 pin 3. Right directional connector 136 may connect to first directional port 412 pin 2. Omnidirectional antenna 120 may connect to second directional port 414 pin 1 via associated wiring 314.

In an alternate embodiment of FIG. 8, secondary port 416 may provide a discrete input to the TCAS processor This discrete input via a discrete connector 820 from secondary port strapping input pin 818 to secondary port common ground pin 816, may indicate to the TCAS processor a specific aerial vehicle configuration.

For example, should the discrete input be open, the TCAS processor may output specific TCAS information to the TCAS display in a traditional manner. Conversely, should the discrete input be grounded, the TCAS processor may output TCAS information to the TCAS display in an alternate manner.

In an additional embodiment of the present invention, placement of the antennas and wiring from the omnidirectional antenna and from TCAS primary directional antenna to the TCAS processor remains unchanged as shown in FIG. 8. The TCAS processor 310 may process all targets as if the TCAS primary directional antenna 110 was mounted on the top of the aerial vehicle and the omnidirectional antenna 120 is mounted on the bottom of the aerial vehicle. The TCAS processor may receive the input from the antennas as shown in FIG. 8, however, the TCAS processor may command an output to the TCAS display that is inverted laterally 180 degrees from the input. In this case, the TCAS display 320 may properly indicate TCAS targets on the display. For example, signals from a TCAS target received from 45 degrees right of the nose of an aerial vehicle may be received by TCAS primary directional antenna mounted to the underside of the aerial vehicle. With no TCAS processor alteration of the current embodiment, the target may be erroneously indicated on the TCAS display as being 45 left of the nose of the aerial vehicle. With TCAS processor modification of the current embodiment, the TCAS target may properly indicate on the TCAS display as right 45. One method of accomplishing this processor task may include a multiplication of the bearing sent by TCAS primary directional antenna by -1.

Additionally, is it further contemplated the TCAS processor may process all signals received in a configuration as shown in FIG. 8, and inverting logic may be housed within the TCAS display. TCAS processor may function as if the TCAS primary directional antenna is mounted on the top of the aerial vehicle while the TCAS primary directional antenna is actually mounted on the aerial vehicle underside. The TCAS processor may output erroneous relative bearing signals to the TCAS display. The TCAS display may be configured to make the inversion and properly display TCAS targets.

The TCAS processor 310 may send and receive signals to and from TCAS primary directional antenna 110 and omnidirectional antenna 120 via associated wiring 312 and 314 respectively. From these inputs, the TCAS processor 310 may process data and output TCAS information to TCAS display 320 via associated wiring 316. Additionally, the TCAS processor 310 may output the TCAS information to additional higher level processors for alternative uses (e.g. Autopilot, data link).

Figure 9:
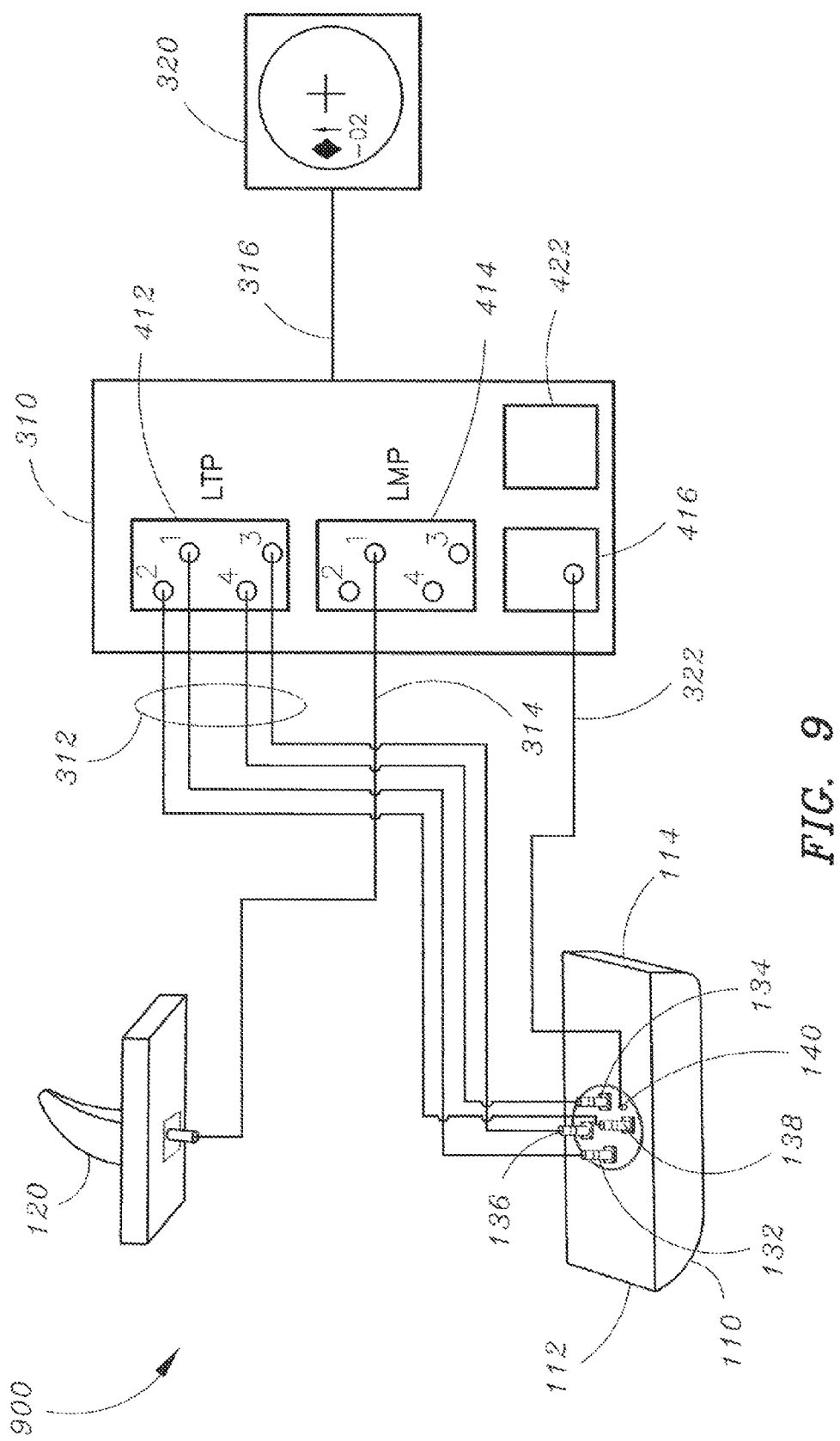
FIG. 9 is a diagram depicting one embodiment of the present invention.

Referring to FIG. 9, a diagram depicting one embodiment of the present invention is shown. Directional connectors 132-138 may connect to first directional port 412 of the TCAS processor 310. Specifically, directional connectors are configured according to the following table:

| Element | TCAS processor port |
| --- | --- |
| FWD 132 | LTP 1 |
| AFT 134 | LTP 4 |
| LEFT 138 | LTP 2 |
| RIGHT 136 | LTP 3 |
| SENSOR 140 | LBP 2 |
| Omnidirectional | LMP 1 |

In the present exemplary embodiment of FIG. 9, directional connectors 132-138 may connect to first directional port via associated wiring 312. Specifically, forward division directional connector 132 may connect to first directional port 412 pin 1. Aft division directional connector 134 may connect to first directional port 412 pin 4. Left directional connector 138 may connect to first directional port 412 pin 2. Right directional connector 136 may connect to first directional port 412 pin 3.

An additional aspect of the present invention may provide a secondary sensor 140 configured within the TCAS primary directional antenna 110. One function of secondary sensor 140 may include determining a location of the TCAS primary directional antenna. For example, at system power up, location sensor may indicate to the TCAS processor, via secondary connector 140 and associated wiring 322, that the TCAS primary directional antenna is mounted on the lower surface of the aerial vehicle. TCAS processor 310 may use the location sensor input to properly output TCAS information (to the display and other processors).

Secondary connector 140 may connect to any one of a plurality of pins on secondary port 416 via associated wiring 322. Secondary connector may comprise a plurality of functions. Secondary connector 140 may also function as an indicator to TCAS processor a desired input. Omnidirectional antenna 120 may connect to second directional port 414 pin 1 via associated wiring 314.

Referring to FIG. 10, a flowchart depicting a preferred embodiment of the present invention is shown. A method for operational placement of Traffic Collision and Avoidance System (TCAS) antennas on an aerial vehicle may comprise the steps of: 1002, configuring and mounting a TCAS primary directional antenna on a lower surface of the aerial vehicle, the TCAS primary directional antenna configured for receiving and determining a direction of reception of an RF signal, in step 1004, mounting an omnidirectional antenna on an upper surface of the aerial vehicle, in step 1006, configuring the aerial vehicle with a TCAS processor, the TCAS processor having a first directional port, a second directional port, and a secondary port. In step 1008, connecting the TCAS primary directional antenna to at least one of the first directional port and the second directional port via a plurality of directional connectors, in step 1010, connecting the omnidirectional antenna at least one of the first directional port and the second directional port. In step 1012, the method may configure the TCAS processor to recognize a mounting location of said TCAS primary directional antenna and a mounting location of the omnidirectional antenna, as mounted on said aerial vehicle. Step 1014 may send and receive signals to the omnidirectional antenna, in step 1016 receiving the direction of reception from the TCAS primary directional antenna, and in step 1018, displaying TCAS information on a TCAS display, the TCAS display configured for displaying TCAS information to a pilot of the aerial vehicle.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the method and system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system for operational placement of Traffic Collision and Avoidance System (TCAS) antennas on an aerial vehicle, the system comprising:
    a TCAS primary directional antenna configured to mount on a lower surface of said aerial vehicle, the TCAS primary directional antenna configured for directionally receiving an radio frequency (RF) signal;
    an omnidirectional antenna configured to mount on an upper surface of said aerial vehicle, said omnidirectional antenna configured for transmission and reception of the RF signal;
    a TCAS display configured to be viewable by a pilot of said aerial vehicle;
    a TCAS processor configured to operatively connect to:
    said directional antenna;
    said omnidirectional antenna; and
    said TCAS display;
    wherein said TCAS processor is configured to:
    send and receive signals via said omnidirectional antenna, said omnidirectional antenna mounted to an upper surface of said aerial vehicle;
    recognize a mounting location of said TCAS primary directional antenna and a mounting location of said omnidirectional antenna, as mounted on said aerial vehicle, said recognizing via a secondary sensor, said secondary sensor operatively connected to said TCAS processor via at least one secondary connector, said secondary connector configured at least to transmit a TCAS primary directional antenna location signal;
    receive said directionally received RF signal from said TCAS primary directional antenna, said TCAS primary directional antenna mounted on said lower surface of said aerial vehicle; and display TCAS information on said TCAS display.

2. The system of claim 1, wherein said aerial vehicle further comprises one of: a heavier than air vehicle, a lighter than air vehicle, a fixed wing vehicle, a rotary wing vehicle, a spacecraft, a powered aircraft, and an unpowered aircraft.

3. The system of claim 1, wherein said lower surface further comprises a surface of said aerial vehicle proximal to the earth during a majority of flight of said aerial vehicle.

4. The system of claim 1, wherein said upper surface further comprises a surface of said aerial vehicle distal from the earth during a majority of flight of said aerial vehicle.

5. The system of claim 1, wherein said TCAS primary directional antenna further comprises at least four azimuth divisions, each one of said at least four azimuth divisions configured to directionally receive said RF signal and transmit RF signal to said TCAS processor.

6. The TCAS primary directional antenna of claim 5, wherein said at least four azimuth divisions further comprise a forward division, an aft division, a left division and a right division.

7. The system of claim 5, wherein said TCAS primary directional antenna is further configured having a plurality of directional connectors, each one of said plurality of directional connectors corresponding to an associated one of said at least four azimuth divisions.

8. The system of claim 7, wherein said plurality of directional connectors is further operatively connected to a first directional port on said TCAS processor.

9. The system of claim 7, wherein said plurality of directional connectors is further operatively connected to a second directional port on said TCAS processor.

10. The system of claim 1, wherein said secondary connector is further operatively connected to a secondary port on said TCAS processor, said secondary port configured to receive said TCAS primary directional antenna location signal.

11. A method for operational placement of Traffic Collision and Avoidance System (TCAS) antennas on an aerial vehicle, the method comprising:
    configuring and mounting a TCAS primary directional antenna on a lower surface of said aerial vehicle, said TCAS primary directional antenna configured for directionally receiving an configured to signal;
    mounting an omnidirectional antenna on an upper surface of said aerial vehicle;
    configuring said aerial vehicle with a TCAS processor, said TCAS processor having a first directional port, a second directional port, and a secondary port;
    connecting said TCAS primary directional antenna to at least one of said first directional port and said second directional port via a plurality of directional connectors;

connecting a secondary connector to said TCAS processor secondary port, said TCAS processor secondary port configured to receive a TCAS primary directional antenna location signal;

connecting said omnidirectional antenna at least one of said first directional port and said second directional port;

configuring said TCAS processor to recognize a mounting location of said TCAS primary directional antenna and a mounting location of said omnidirectional antenna, as mounted on said aerial vehicle;

sending and receiving signals to said omnidirectional antenna;

receiving said direction of reception from said TCAS primary directional antenna; and displaying TCAS information on a TCAS display, said TCAS display configured for displaying TCAS information to a pilot of said aerial vehicle.

12. The method of claim 11, wherein said aerial vehicle further comprises one of: a heavier than air vehicle, a lighter than air vehicle, a fixed wing vehicle, a rotary wing vehicle, a spacecraft, a powered aircraft, and an unpowered aircraft.

13. The method of claim 11, wherein said lower surface further comprises a surface of said aerial vehicle proximal to the earth during a majority of flight of said aerial vehicle and said upper surface further comprises a surface of said aerial vehicle distal from the earth during a majority of flight of said aerial vehicle.

14. The method of claim 11, wherein said TCAS primary directional antenna further comprises at least four azimuth divisions, each one of said at least four azimuth divisions configured to directionally receive said RF signal and transmit RF signal to said TCAS processor, said at least four azimuth divisions further comprising at least a forward division, an aft division, a left division and a right division.

15. The method of claim 14, wherein each one of said plurality of directional connectors corresponds to an associated one of said at least four azimuth divisions.

16. The method of claim 11, wherein said TCAS primary directional antenna is further configured with a secondary sensor, said secondary sensor operatively connected to said TCAS processor via said at least one secondary connector, said secondary connector configured at least to transmit a TCAS primary directional antenna location signal.

* * * * *